Oct. 31, 1967 P. VANDEN BOSCH 3,349,436
APPARATUS FOR EXTRUDING FOAMED PLASTICS AND THE LIKE
Filed Sept. 21, 1965 3 Sheets-Sheet 2

INVENTOR
PETER VANDEN BOSCH
BY John J. Rogan
ATTORNEY

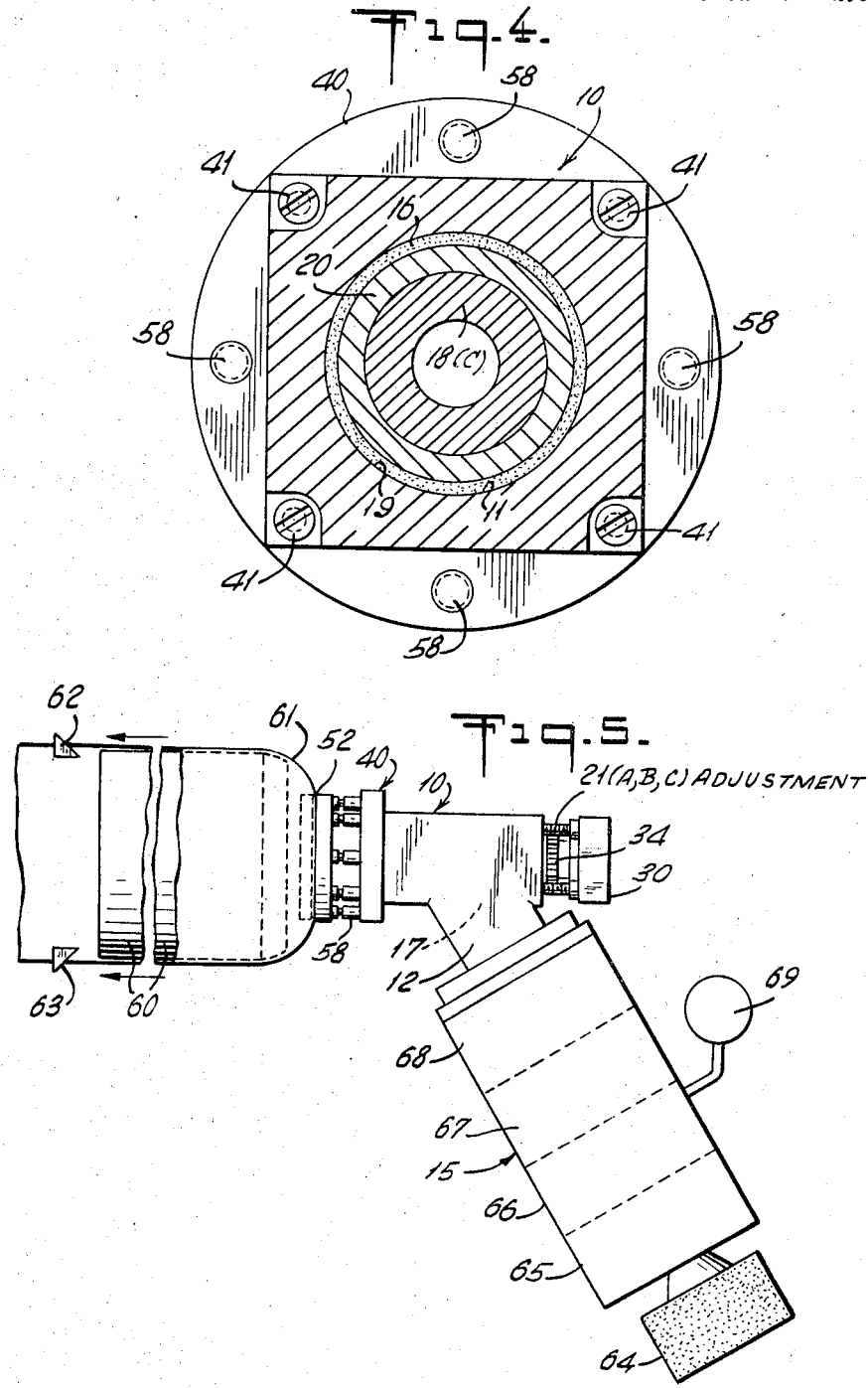

United States Patent Office 3,349,436
Patented Oct. 31, 1967

3,349,436
APPARATUS FOR EXTRUDING FOAMED
PLASTICS AND THE LIKE
Peter Vanden Bosch, Waldwick, N.J., assignor to Danadyne, Inc., Linden, N.J., a corporation of New York
Filed Sept. 21, 1965, Ser. No. 488,952
10 Claims. (Cl. 18—14)

This invention relates to the extruding art and more particularly it relates to the art of making foamed plastic sheets or films.

While various forms of extrusion apparatus have been heretofore devised, it has been found that in the manufacture of such articles as foamed plastic sheets or films, very special problems are encountered which are peculiar thereto. Thus it is highly important that the pressure and expansion of the foamed batch in its passage through and emergence from the sheet-forming die be extremely accurately controlled. One reason is that in order to insure, amongst other things, uniformity of thickness, surface smoothness and the desired interior cellular construction, the forming path through the extrusion die must be capable of a series of independent adjustments determined by the character and composition of the molten extrudate and the nature of the original resinous plastic pellets or particles that are fed into the extrudate.

It has also been found that to achieve the desired uniformity of physical characteristics in the finished plastic sheet or film, as well as the interior cellularized formation, the molten plastic should be extruded in a cylindrical or annular shape as it leaves the mouth of the extruding die so that thereafter it can be subjected to a controlled cooling and setting schedule such for example as described in the co-pending application of Thomas M. Britt and Peter Vanden Bosch, Ser. No. 417,332, filed Dec. 10, 1964. I have found that in order to achieve the desired uniformity in the finished foamed plastic product, it is necessary not only to control the size of the final emergence mouth of the extrusion die, but also to provide a series of independent controls over other intermediate stages within the die as the molten plastic is passing from the inlet port of the die throughout its length.

Accordingly, one of the principal objects of this invention is to provide an extrusion die for the manufacture of foamed or cellularized plastics which is capable of a series of independent die passage dimensional adjustments. This enables an attendant to control the finished product by such adjustments while the plastic is passing through the die without stopping the extruding operation and without deleterious change of pressure within the die. If it appears that the nature of the extrudate from the die varies from predetermined physical characteristics, the pressure at various stages within the die can be independently adjusted during extrusion without shutting down any part of the extrusion system.

Another object is to provide an improved extrusion die especially suited for the manufacture of foamed or cellularized plastic, wherein the extrudate source is connected to the die at an angle to the longitudinal axis of the die and wherein the necessary adjustments can be made during the extruding operation and without stopping the flow of extrudate from the extrudate source through the die.

A feature of the invention relates to a novel extrusion die of the kind which extrudes a molten plastic and which is capable of extruding the plastic in an annular or tubular cylindrical sheet, the die having inner and outer lips whose spacing can be accurately controlled during extrusion so that positive control is provided at the actual point of emergence of the extrudate from the die. As a result of this precise control, the quality of the foamed plastic sheet or film can be accurately controlled and made uniform for large batches of extrudate. This enables uniform foamed sheets or films to be produced notwithstanding that the original source of the extrudate, such as resinous pellets and the like, may vary from one batch to another.

Another feature of the invention relates to an improved die mouth for plastic extruding dies wherein spaced die lips are provided which can be subjected to a plurality of independent dimensional controls, whereby the output from the die can be accurately controlled by maintaining the requisite pressure levels on the extrudate in its passage through the die.

Another feature relates to the combination of an extrudate die having a cylindrical extrudate forming passage which is coupled at an angle to an extruder machine, and wherein the mouth of the die is formed with two independently adjustable lips which define an emergence mouth at substantial right angles to the longitudinal axis of the die but whose intermediate path through the die is of adjustable tapered size whereby the extrudate can be formed through a sheet, film or the like, while maintaining the requisite volume and pressure of the molten extrudate through the die until it actually emerges from the die mouth.

A further feature relates to the novel organization, arrangement and relative location proportioning an interconnection of parts which cooperate to provide an improved die for forming foamed plastic sheets and the like.

Other features and advantages not specifically enumerated will be apparent after a consideration of the following detailed descriptions and the appended claims.

In the drawing,

FIG. 4 is a reduced size sectional view of FIG. 1 taken along the line 4—4 thereof and viewed in the direction of the arrows;

FIG. 5 is a generalized schematic diagram of an extruding system incorporating the die of FIGS. 1–3.

Figure 1:
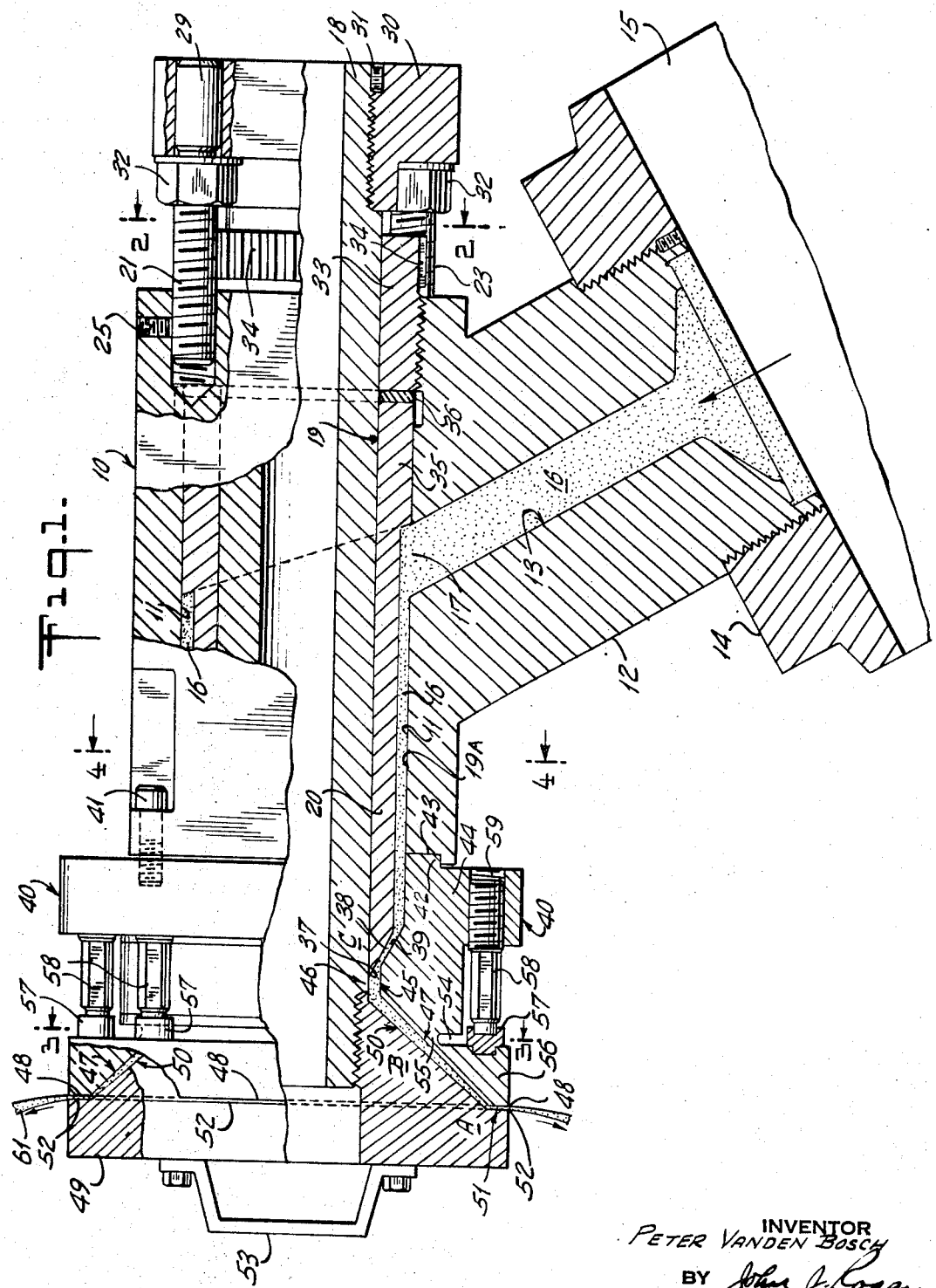
FIG. 1 is a plan view partly sectionalized of a sheet-forming die according to the invention.
Figure 2:
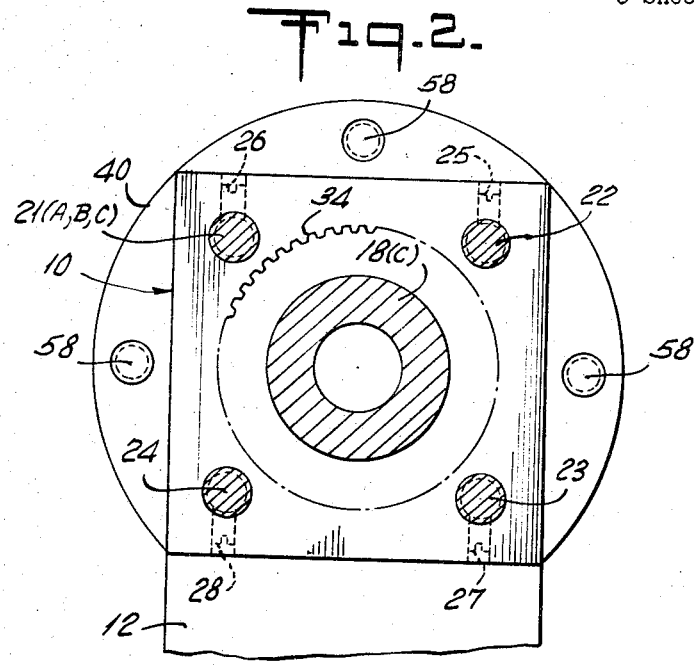
FIG. 2 is a sectional view of FIG. 1 taken along the line 2—2 thereof and viewed in the direction of the arrows.
Figure 3:
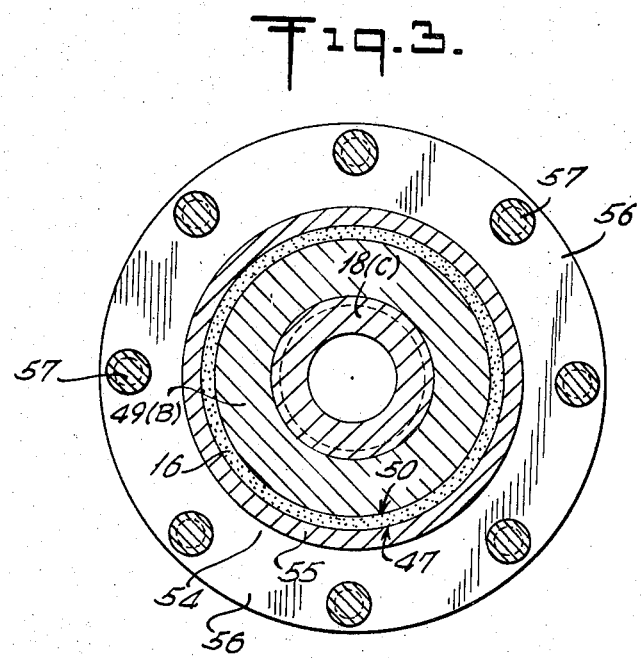
FIG. 3 is a sectional view of FIG. 1 taken along the line 3—3 thereof and viewed in the direction of the arrows.

The extruding and sheet-forming die according to the invention comprises a metal casting 10 having a cylindrical bore 11 and formed with an integral angularly extending portion 12 with a central bore 13. Threaded into the inlet end of member 12 is a flange member 14 which enables the die to be fastened in any suitable manner to the outlet end of any well-known plastic extruding machine 15, which delivers in the direction of the arrow a continuous supply of molten foamable plastic 16 under precisely controlled consistency and pressure.

While the invention is not limited to any particular composition of the molten plastic batch, preferably it consists of thermoplastic resin such as polystyrene together with any well-known nucleating agents. In accordance with the invention member 12 is formed so that its bore axis is at less than right angles with respect to the longitudinal axis of the bore 11 of the die for purpose to be described hereinbelow. Preferably that angle should be approximately between 45 degrees or 60 degrees.

Bore 13 communicates with the bore 11 through an entrance port 17. Passing concentrically through the bore of member 10 is a cylindrical metal member 18 whose outer diameter is less than the inside diameter of the bore, thus defining a cylindrical tubular space 19 which is in direct communication with the passage 13. Slidably mounted in the space 19 is a cylindrical metal sleeve 20 which acts as a gauging mandrel and having a reduced outer diameter at its left-hand portion for purposes to be described hereinbelow. The right-hand end of casting 10 is of square conformation and threaded into the square end of the casting 10 are four adjusting bolts 21–24 which can be locked in adjusted position by respective set screws 25–28. Bolts 21–24 terminate in unthreaded ends 29 which are located within corresponding round openings in a square block 30 which is threaded on the right-hand end of member 18 and locked in place by a set screw 31. The ends 29 are capable of rotation but are anchored against longitudinal movement in block 30. Each bolt 21–24 has affixed thereto a respective bolt-head 32. Thus by loosening the set screws 25–28 and by turning bolts 21–24, the member 18 can be adjusted along the longitudinal axis of the die for purpose to be described hereinbelow.

Adjustably threaded into the square end of casting 10 is another metal sleeve 33 which has fastened to its right-hand end a knurled cap 34 for adjusting the position of the sleeve 33 within the casting. The internal diameter of sleeve 33 is a close sliding fit around the external diameter of member 18. This sliding fit is sufficiently close so that no extrudate can pass between the members 18 and sleeve 33, thus defining a tubular cylindrical chamber wherein is slidably positioned the gauging sleeve 20. Sleeve 20 is also a close sliding fit on the external face of sleeve 18. The right-hand end 35 of sleeve 20 is of sufficient thickness so as to provide a close sliding fit between the external face of member 18 and the internal cylindrical bore of member 10. Located between the said right-hand end 35 and the left-hand end of sleeve 33 is a bronze thrust-washer 36. The remaining length of sleeve 20 is of reduced thickness, thus defining a tubular passageway 19A between the sleeve 20 and the internal cylindrical bore 11 of casting 10. The extreme left-hand end of sleeve 20 is tapered as indicated by numeral 37 to define a tapered constricted passage 38 with the corresponding tapered wall 39 of an annular metal block 40.

The gauging member 20 is freely slidable along sleeve 18 and its position towards the right is limited by engagement with the thrust-washer 36. Sleeve 20 is forced towards the right against washer 36 by the pressure of the extrudate 16 which flows through the tubular passageway 19A and engages the tapered end 37 with a component of force sufficient to force the sleeve 20 against washer 36. Therefore by turning member 34, the sleeve 33 can be adjusted toward the right or left, which results in a corresponding change in the width of the constricted passage 38.

Block 40 is generally of annular form and is fastened to the left-hand end of casting 10 by means of four bolts 41. As shown more clearly in FIG. 1, member 40 has a flange 42 which tightly fits within a corresponding recess 43 in the end of casting 10. The portion 44 of member 40 has an inner cylindrical diameter which is the same as the inner diameter of bore 11 in casting 10. The tapered portion 39 of member 40 defines with the tapered face 37, the above mentioned tapered channel 38. Member 40 also has a short cylindrical portion 45 which cooperates with the part 46 of member 18. Member 40 also has a tapered face 47 terminating in an annular flat face 48 at right angles to the longitudinal axis of the die.

The left-hand end of member 18 has threaded thereon an annular metal block 49 which on its right-hand face is formed with an inclined tapered face 50 and with a flat annular face 51. Thus the portion 50 defines with the portion 47 an inclined tapered passage for the extrudate; and the portion 51 forms with the portion 48 an annular emergence mouth 52 for the extrudate. Thus this mouth is constituted of the inner die lip 48 and the outer die lip 51. Fastened to the left-hand end of block 49 is any suitable coupling member 53 for attaching the die to a cylindrical forming unit of any known kind but preferably of the kind disclosed in said application Ser. No. 417,332.

From the foregoing it will be seen that the die is capable of a plurality of individual and discrete adjustments to control the pressure of the extrudate within the die. The maintenance of this pressure is necessary since the expansion of the foamed plastic does not occur until the pressure is released by the emergence of the plastic from the mouth 52 of the die. It has been found that these independent adjustments are necessary so that the expansion characteristics of the foamed plastic, as it leaves the die, may be controlled in accordance with any prescribed schedule. The more critical areas of adjustment are those represented by the letters A, B and C. By turning wheel 34 the position of sleeve 33 can be moved in either direction and thus the spacing between faces 37 and 39 can be correspondingly controlled, it being understood that the member 35 is forced into contact with the thrust-washer 36 by the pressure of that extrudate 16, thus providing the adjustment C. By adjusting the bolts 21–24 the position of member 18 within the bore 11 of the die can be changed, thus changing the spacing between faces 47 and 50 for adjustment B. I have found that the third adjustment, namely adjustment A at the actual emergence mouth 52 can be even further precisely controlled. For that purpose, and as shown in FIG. 1, the member 40 is undercut or annularly grooved at the portion 54 leaving a relatively thin flexing portion 55. Thus the left-hand portion 56 of member 40 can be bent towards and away from the faces 50 and 51 enabling micrometer adjustment of the size of the emergence mouth 52 of the die. For that purpose the portion 56 of member 40 has tightly fitted therein an annular bearing ring 57 to receive the rounded ends of a series of eight equally spaced bolts 58. The right-hand end of each of these bolts is threaded in the block 40 and the extreme end of each bolt has a slot 59 so that by turning each such bolt in a clockwise direction as seen in FIG. 4, the portion 56 is forced to the left to correspondingly reduce the width of the emergence mouth 52. It will be understood, of course, that the member 40 and particularly the portion 56 is of a suitable metal such as steel so that the reduced portion 55 enables the portion 56 to act with sufficient springiness when the corresponding bolts 58 are turned in the opposite or counterclockwise direction. Thus the portion 56 returns by its springiness to a position determined by the setting of the bolts 58. In other words, the bolts 58 provide a series of independent adjustments around the periphery of the die so as to control the width of the emergence mouth 52 uniformly at a plurality of equally spaced points thereround.

While the die hereinabove described is capable of use in any sheet-forming system, preferably it is used in connection with a forming block 60 such as described in said application Ser. No. 417,332. Thus as shown in FIG. 5, the extruded plastic sheet 61 as it leaves the mouth 52 is in a limp annular form and at this stage the pressure is released allowing the plastic to expand in its thickness by expansion of the multiplicity of gas pockets or cells in the body of the sheet. At this point of emergence the temperature of the extruded sheet 61 is above the final setting or curing temperature of the sheet and it can be drawn in a somewhat cylindrical or balloon shape over the forming block 60 so that while passing in cylindrical form along that block, as indicated by the arrows, it is subjected to a precisely controlled setting temperature gradient. As it leaves the block 60 the cylindrically shaped expanded sheet can be slit into two halves by means of knife edges 62, 63 thus dividing the cylindrical sheet into two separate sheets which are flattened and rolled upon respective reels (not shown) as described in said application Ser. No. 417,332.

From the foregoing it will be seen that the extrudate from the extruding machine 15 enters the port 17 of the die in a non-tubular viscous mass and it is shaped to a cylindrically tubular mass in the die and flows through cylindrical passage 19 and thence radially outward in annular form from the die mouth 52.

While the invention is not limited to any particular extrudate or extruding machine, the invention is specially adapted to extrudates in the form of thermoplastic materials such as polystyrene or other polymerized resin which can be supplied from a suitable hopper 64 in the form of minute pellets or beads having a size for example, of the order of 1/16 of an inch to 1/8 of an inch in diameter. In the well-known manner the machine 15 may include the usual extruding barrel and extruding screw (not shown) and may include a series of heated stages 65, 66, 67, 68 wherein the resin beads are transformed into a molten uniform mass. In the well-known manner, some of these stages may constitute compression or compacting stages and are maintained at a suitable temperature to melt the pellets. Likewise in the well-known manner any well-known nucleating material may be introduced into the extruding machine such for example as a mixture of sodium bicarbonate, sodium borate and citric acid. Likewise at one of the stages in the extruder in the well-known manner, a suitable gas such as normal pentane is introduced from a supply 69, under pressure for example of about 2000–3000 pounds per square inch. In such a system it is highly important, therefore, that the pressure on the extrudate be maintained even during its passage through the forming die. The foregoing die with its respective multiple adjustments enables the desired critical control of the pressure to be maintained while at the same time providing for an adjustment of the exit mouth to produce foamed plastic sheets of different thicknesses. For a more detailed description of a typical extruding machine and thermoplastic foamable resin that may be used, reference may be had to said application Ser. No. 417,332.

While one specific embodiment of the invention has been described herein, it will be understood that it is done merely for explanatory purposes and not by way of limitation of its scope. Features disclosed in this application but not claimed herein are claimed in said application Ser. No. 417,332 and in my co-pending application Ser. No. 488,-921 entitled "Die for Foamable Plastics and the Like" filed on Sept. 21, 1965, now abandoned, and in my co-pending application entitled, "Precision Die for Manufacture of Foamed Plastics and the Like," 488,843 also filed on Sept. 21, 1965.

What is claimed is:

1. A die for forming molten extrudate into a sheet comprising means defining a tubular passage surrounding the longitudinal axis of the die for forming a molten extrudate into a molten tubular mass, an inlet port for conveying molten extrudate to said passage, means defining an exit die mouth from which the extrudate is to emerge, said means defining said exit mouth including a pair of annular spaced members which provide serially arranged tapered passages between said cylindrical passage and said exit mouth, said means defining the said exit mouth further including a pair of die lips, means to adjust the spacing between said lips, and means for adjusting a dimension of one of said tapered passages independently of said means to adjust said spacing between said lips.

2. A die for forming molten extrudate into a sheet comprising means defining a tubular passage surrounding the longitudinal axis of the die for forming a molten extrudate into a molten tubular mass, an inlet port for conveying molten extrudate to said passage, means defining an exit die mouth from which the extrudate is to emerge, said means defining the said exit mouth including a pair of die lips, said means defining the said exit mouth further including a pair of annularly spaced members which provide a constricted annular path between said passage and said exit mouth, said pair of annularly spaced members defining said constricted path in two serial sections of opposite inclination with respect to the longitudinal axis of the die, means for adjusting a dimension of one of said serial sections, and means to adjust the spacing between said lips independently of said means for adjusting said dimension of one of said serial sections.

3. A die for forming a molten plastic into a sheet comprising means defining a cylindrical passage concentrically surrounding the longitudinal axis of the die, an inlet port for conveying plastic extrudate into said passage, means defining an exit mouth for the die, means defining an adjustable-width annular passage between said cylindrical passage and said mouth, means to adjust the width of said annular passage independently of the width of said cylindrical passage, said last mentioned means including a member longitudinally adjustable in said cylindrical passage, and manually operative means external of the die for adjusting the position of said member within said passage.

4. A die according to claim 3 in which a gauging mandrel sleeve is slidable in said cylindrical passage and is arranged to be moved in one direction by manually operable means and in the opposite direction by the back pressure of the extrudate.

5. A die according to claim 4 which includes a main fixed body portion having a cylindrical bore, said slidable gauging mandrel sleeve being slidably supported on said member, said mandrel defining with the inner face of said bore the width of said cylindrical passage, and means for manually adjusting the position of said mandrel in said passage independently of the adjustment of said member and thereby to adjust the width of at least a portion of said annular passage.

6. A die according to claim 5 in which the means defining said exit mouth includes a first mouth-defining element attached to and movable as a unit with said member, a second mouth-defining element, and means to adjust the spacing between said two mouth-defining elements independently of the said adjustment of said mandrel.

7. A die for forming cellularized plastic sheets, comprising a fixed main body having a cylindrical bore, a first adjusting sleeve adjustably threaded into one end of said bore, an adjusting tubular member slidably passing through the first sleeve and extending beyond the opposite end of the bore said tubular member defining with the inner surface of said bore a cylindrical chamber for molten extrudate, an inlet port for said chamber and connectable to a source of molten plastic extrudate, exit mouth means for said die including an inner annular die lip fastened to the opposite end of said bore, an outer annular die lip in spaced relation to the inner die lip, said outer die lip being fastened to said tubular member at the end thereof which extends from said bore, manual means to adjust the longitudinal position of said tubular member and thereby to adjust the spacing between said inner and outer lips, and additional means for flexibly bending a portion of the inner lip means to provide a fine adjustment of the spacing between said inner and outer lips.

8. A die according to claim 7 in which a second slidable sleeve forming a gauging mandrel surrounds the said tubular member second sleeve and has an indirect portion to determine the width of said chamber, said second sleeve being in adjustable abutting engagement with the end of the first sleeve whereby an adjustable constriction is provided between said cylindrical chamber and said exit mouth.

9. A die according to claim 7 in which said inner lip is in the form of an annular block having a reduced thickness region whereby the outer rim of said block can be resiliently bent towards the outer die lip.

10. A die for forming molten plastic such as a cellularized plastic extrudate into sheets, comprising a fixed member having a bore, an inlet port for the die arranged to receive molten plastic extrudate, means within said bore and communicating with said port to form the molten extrudate into a cylindrical shape, a die exit mouth for the extrudate, an extrudate feed passage means located at less than right angles with respect to the longitudinal axis of the die and arranged to receive molten extrudate under pressure, said exit mouth being of annular shape and communicating with said cylindrical passage through an intervening adjustable constricted passage section, and means to adjust the width of said exit mouth and separate means to adjust the width of said constricted passage section.

References Cited

UNITED STATES PATENTS

| | | | |
|---|---|---|---|
| 2,185,701 | 1/1940 | Boyle | 18—13 |
| 2,239,408 | 4/1941 | Wallace. | |
| 3,105,269 | 10/1963 | Seubert | 18—14 |
| 3,105,439 | 10/1963 | Young | 18—14 XR |
| 3,122,790 | 3/1964 | Albert | 18—14 |
| 3,212,134 | 10/1965 | Yokana | 18—12 XR |

FOREIGN PATENTS

| | | |
|---|---|---|
| 153,610 | 10/1953 | Australia. |
| 1,028,325 | 4/1958 | Germany. |
| 1,382,578 | 11/1964 | France. |

WILLIAM J. STEPHENSON, *Primary Examiner.*